US005639238A

United States Patent [19]

Fishburne, Jr.

[11] Patent Number: 5,639,238

[45] Date of Patent: Jun. 17, 1997

[54] METHODS FOR THE VIBRATIONAL TREATMENT OF ORAL TISSUE AND DENTAL MATERIALS

[76] Inventor: Cotesworth P. Fishburne, Jr., 1144 India Hook Rd., Suite F, Rock Hill, S.C. 29732

[21] Appl. No.: 305,180

[22] Filed: Sep. 13, 1994

[51] Int. Cl.[6] ........ A61C 5/00

[52] U.S. Cl. ........ 433/215

[58] Field of Search ........ 433/118, 125, 433/119, 120, 121, 122, 123, 124, 215, 216, 86; 601/142, 2; 15/22.1, 22.2

[56] References Cited

U.S. PATENT DOCUMENTS

| | | | |
|---|---|---|---|
| 3,412,469 | 11/1968 | Newman . | |
| 3,563,233 | 2/1971 | Bodine | 601/142 |
| 3,592,188 | 7/1971 | Barnett | 601/142 |
| 3,651,576 | 3/1972 | Massa . | |
| 3,898,739 | 8/1975 | Gayso | 433/118 |
| 3,921,044 | 11/1975 | McShirley | 433/118 |
| 3,967,617 | 7/1976 | Krolik . | |
| 4,219,619 | 8/1980 | Zarow | 433/118 |
| 4,309,989 | 1/1982 | Fahim | 601/2 |
| 4,347,839 | 9/1982 | Youngclaus, Jr. . | |
| 4,850,875 | 7/1989 | Takatsu | 433/226 |
| 4,909,241 | 3/1990 | Burn et al. | 433/122 |
| 5,044,356 | 9/1991 | Fishman et al. | 433/80 |
| 5,133,661 | 7/1992 | Euvrard | 433/120 |
| 5,151,030 | 9/1992 | Comeaux | 433/118 |
| 5,314,333 | 5/1994 | Irmer et al. | 433/118 |
| 5,437,606 | 8/1995 | Tsakamoto | 433/86 |

FOREIGN PATENT DOCUMENTS

| | | | |
|---|---|---|---|
| 2517956 | 6/1983 | France | 433/125 |
| 2755515 | 6/1979 | Germany | 433/118 |

OTHER PUBLICATIONS

Psychophysical measurement on pain perception after administration of a topical anesthetic, Quintessence International, vol. 22, No. Apr. 1991, pp. 311–315, Kincheloe, et al.

A clinical evaluation of three topical anaesthetic agents, Australian Dental Journal 1992; 37(4):266–70, E.R. Vickers, A. Punnia–Moorthy.

Topical Ice: A Precursor to Palatal Injections, Journal of Endodontics, vol. 15, No. 1, Jan. 1989, Henry Harvert, DMD, pp. 27–28.

Technique to diminish discomfort from the palatal injection, The Journal of Prosthetic Denistry, Jun. 1992, 67(6) pp. 901–902, J.D. Duncan, et al.

Frigi–Dent, Ellman International, Inc., Product Information, A2DV–1018.

*Primary Examiner*—Cary E. O'Connor
*Attorney, Agent, or Firm*—Banner & Witcoff, Ltd.

[57] ABSTRACT

An apparatus and methods of its use in the treatment of oral tissue are disclosed. The apparatus of the present invention includes a vibrator that is adapted to allow at least one shaft to be mounted thereon, at least one shaft defining a first end and a second end wherein the first end is adapted to be mounted to the vibrator such that vibrational motion is transferred to the shaft, and a tip mounted on the second end of the shaft. The size and conformation of the tip can be altered to the specific treatment. The apparatus uses a vibrational massage to treat and enhance treatment of oral tissue. The apparatus is particularly effective in providing an enhanced treatment used for the application of medicaments to oral tissue, the placement of filling materials in prepared cavities, the treatment of dry sockets, burnishing in desensitizers, placement and cementation of inlays and onlays and treatment of temporomandibular joint disease.

8 Claims, 2 Drawing Sheets

Fig.1
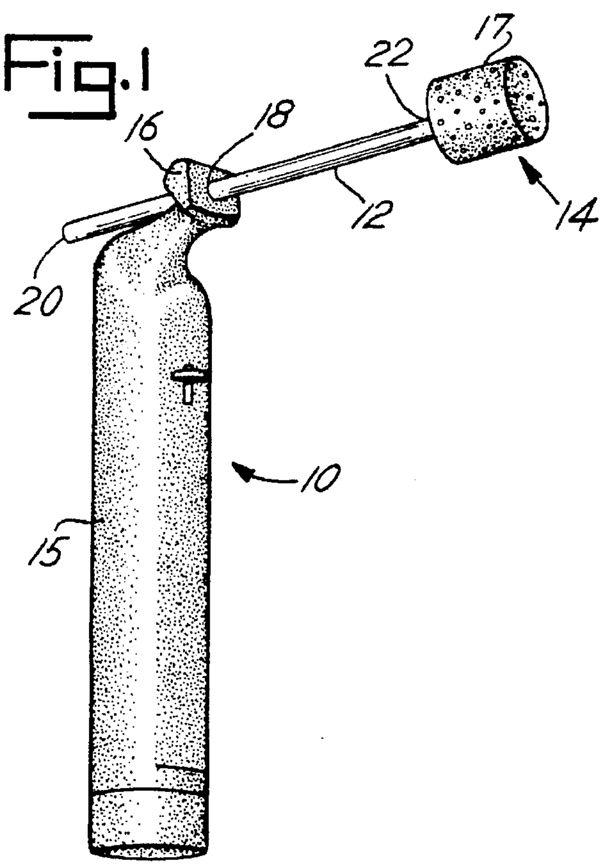
Fig.2
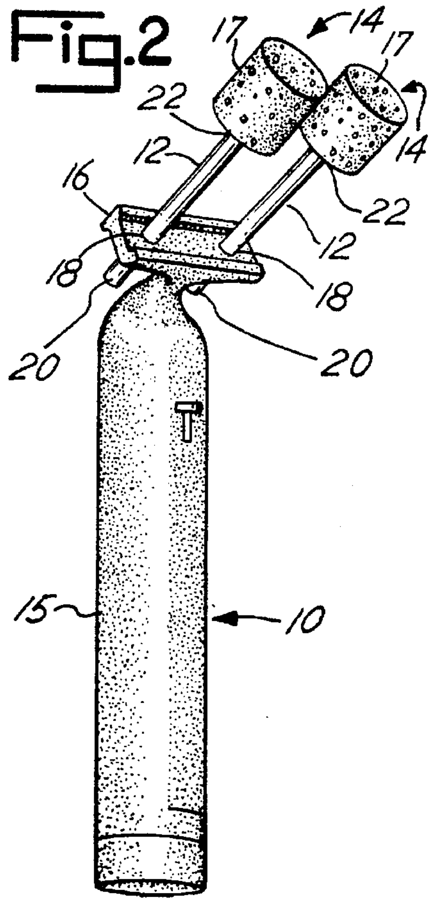
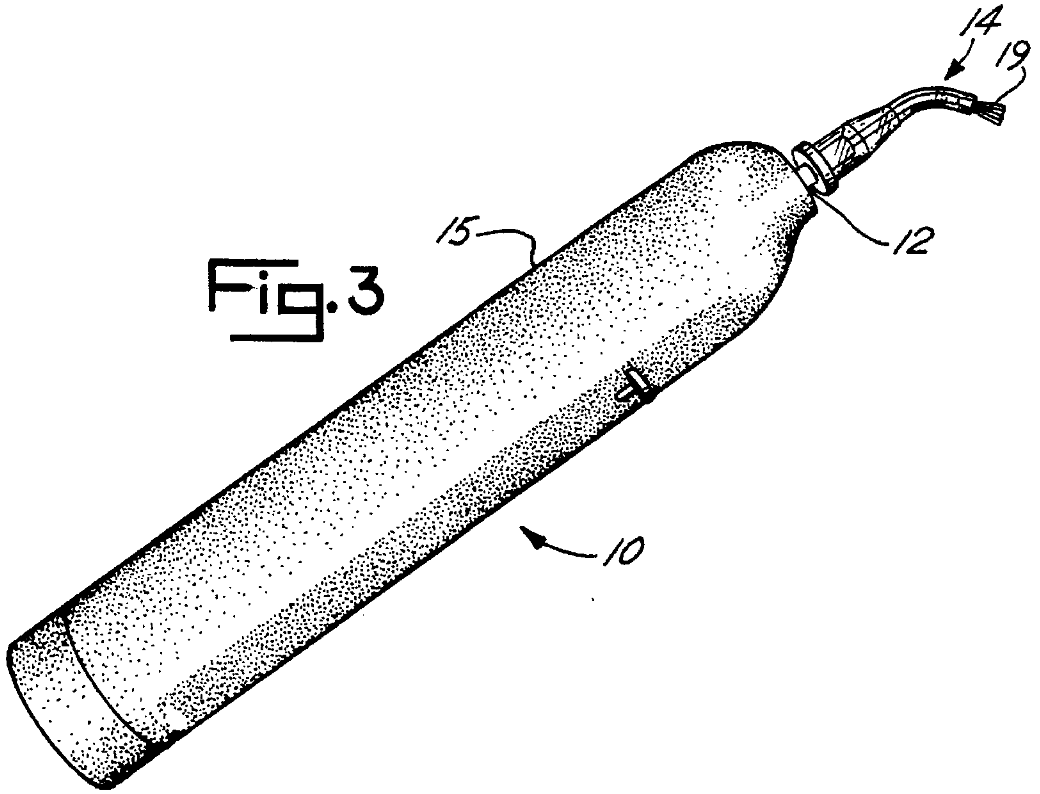
Fig.3

METHODS FOR THE VIBRATIONAL TREATMENT OF ORAL TISSUE AND DENTAL MATERIALS

BACKGROUND OF THE INVENTION

The present invention relates generally to an apparatus and methods for easing the discomfort associated with dental procedures, including the application of oral medicaments and dental materials. More particularly, the present invention relates to an apparatus and methods for the application of topical anesthetic to the alveolar mucosa to allow substantially painless injection of oral anesthetic.

A major reason people do not receive proper dental care is the fear and anxiety relating to the potential pain from dental treatment. One of the major sources of this fear and anxiety come from the pain associated with the injection of anesthetics. As a result, there has been created both a physical and a psychological barrier to some people receiving proper dental care.

The dental profession, as a result, is continuously looking for ways to reduce the pain associated with dental procedures. The principal procedure associated with discomfort is the injection of oral local anesthetic. One method colony used to reduce discomfort is the application of a topical anesthetic to the target tissue, prior to injection. This anesthetic is typically applied with cotton swabs and allowed to be in contact with the target tissue for an appropriate period of time. While this method has reduced the discomfort associated with treatment including anesthetic injections, because the topical anesthetic does not substantially penetrate the tissue substantial discomfort may remain.

Another method suggested for the reduction of discomfort is "freezing" the target tissue prior to injection. Two methods of "freezing" the target tissue have been suggested. First, it has been suggested that treatment of the target tissue with topical ice will substantially reduce the pain associated with injections. See, Harbert, *Topical Ice: A Precursor to Palatal Injections,* J. of Endodontics, Vol. 15 (No. 1), p. 27 (1989). This method is, however, very time consuming sometimes requiring more than ten minutes to complete an anesthetic injection. Second, it has been suggested that treatment of the target tissue with a cotton pellet saturated with dichlorodifluoromethane will effectively allow injection without pain. See, Duncan et al, *Technique to diminish discomfort from the palatal injection,* The J. of Prosthetic Dentistry, Vol. 67 (No. 6), p. 901 (1992). While effective in reducing the discomfort from the injection, this method can lead to post operative discomfort due to "burning" of the target tissue by the cold cotton pellet.

Other methods have also been developed to relieve the pain of anesthetic injection including lasers and TENS. Both of these methods require substantial investment in equipment and have shown only mixed results.

There remains a need for a simple, efficient and economical apparatus and method for reducing or eliminating the discomfort associated with oral anesthetic injections.

Another problem in modern dental practice is the filling of caries lesions or cavity preparations with paste-like materials. Dental practice has recently moved away from amalgams to paste-like restorative materials, including composite resins, glass ionomers and sealants. After placement, these are cured or polymerized with a special light. Several problems have been associated with the use of these paste-like material including: (1) the formation and incorporation of air bubbles in these materials; (2) the lack of penetration into the cavity preparation; and (3) the tendency of the paste-like materials to stick to the instruments used in placement of the material.

There remains a need for a simple efficient and economical apparatus and method for reducing or eliminating the air bubbles associated with these materials, facilitating penetration of the material into the cavity preparation, and making the material less likely to stick to the instrument.

SUMMARY OF THE INVENTION

The apparatus of the present invention includes a vibrator that is adapted to allow at least one shaft to be mounted thereon, at least one shaft defining a first end and a second end wherein the first end is adapted to be mounted to the vibrator such that vibrational motion is transferred to said shaft, and a tip mounted on the second end of the shaft. The size and conformation of the tip can be altered to the specific treatment. As an example, for the application of medicaments, the tip may be a soft absorbent pad capable of absorbing the medicant, whereby when the pad is put on the oral tissue, the pad massages the tissue as a result of the vibrating motion.

In a principal aspect, the present invention is a method of reducing the discomfort from oral anesthetic injections. The methods includes the steps of (1) applying a topical anesthetic to the tissue to be injected; (2) applying a pad to the tissue, the pad further containing the topical anesthetic; and (3) vibrating the pad with a mechanical vibrator, at a speed sufficient to massage the anesthetic into the tissue. The vibration creates some feeling of anesthesia in and of itself. In addition, the vibration provides a psychological distraction from the discomfort associated with dental treatment, such as the prick associated with the insertion of the needle into the oral mucosa.

In another principal aspect, the present invention is a method for removing air bubbles from filling material. The methods include the steps of filling the caries lesion with the filling material; applying the tip of the apparatus to the material; and vibrating the material to remove the air bubbles. It is believed that this vibration lowers the viscosity of the filling material allowing better penetration into the prepared cavity and makes the material less likely to stick to the placement instrument.

The present invention further relates to methods for the placement of dental fixtures such as inlays, onlays, crowns and retractor string as well as the placement of cement materials during pulpotomy/pulpectomy of primary teeth and "permanent" teeth. In each case the method takes advantage of the properties of the apparatus of the present invention to lessen the viscosity of a fluid thixotropic material and thereby allow it to more fully flow into and penetrate the dental tissue.

It is an object of the present invention to provide a safe, economical and easy to use apparatus and method that reduces or eliminates the discomfort associated with the injection of oral anesthetics.

Another object of the present invention is to provide a new apparatus and method for the application of medicaments to oral tissue, including the treatment of aphthous ulcers.

It is a further object of the present invention to provide apparatuses and methods for massaging the alveolar mucosa tissue to aid in the penetration of topical anesthetic into the tissue, relax the muscle tissue, increase vascularity and over stimulate surface nerve receptors to cause numbness and allow injection of oral anesthetic with little or no discomfort.

It is still a further object of the present invention to provide an apparatus and methods that increase the efficiency of dental operations such as removing air bubbles from filling material as it is placed in the cavity preparation, burnishing in fluoride for the treatment of "white spot" pre-carious lesions, burnishing in desensitizers, vibrating in sealants, vibrating medicaments into tissue for the treatment of dry sockets (Alveolar Osteitis), the placement of retractor string, the vibrating of porcelain and resin inlays and onlays to enhance delivery and cementation and the vibrating in of cements and pastes into pulpotomy/pulpectomy of primary teeth.

It is a further object of the present invention to reduce the tension of tight intra-oral muscles (the internal pterygoid muscles) caused by temporomandibular joint disease (TMJ).

Yet a further object of the invention is to provide an apparatus and methods for the vibration of a swollen fistula or abscess, prior to lancing.

These and other objects, features, and advantages of the present invention are discussed or apparent in the following detailed description.

BRIEF DESCRIPTION OF THE DRAWING

A preferred embodiment of the present invention is described herein with reference to the drawing wherein:

FIG. 1 is a perspective of an embodiment of the apparatus of the present invention with a soft pad tip.

FIG. 2 is a perspective of the apparatus with the present invention adapted to hold multiple soft pad tips.

FIG. 3 is a perspective of the apparatus of the present invention with bristles for the placement of dental materials.

DETAILED DESCRIPTION OF THE PREFERRED EMBODIMENT

Figure 4:
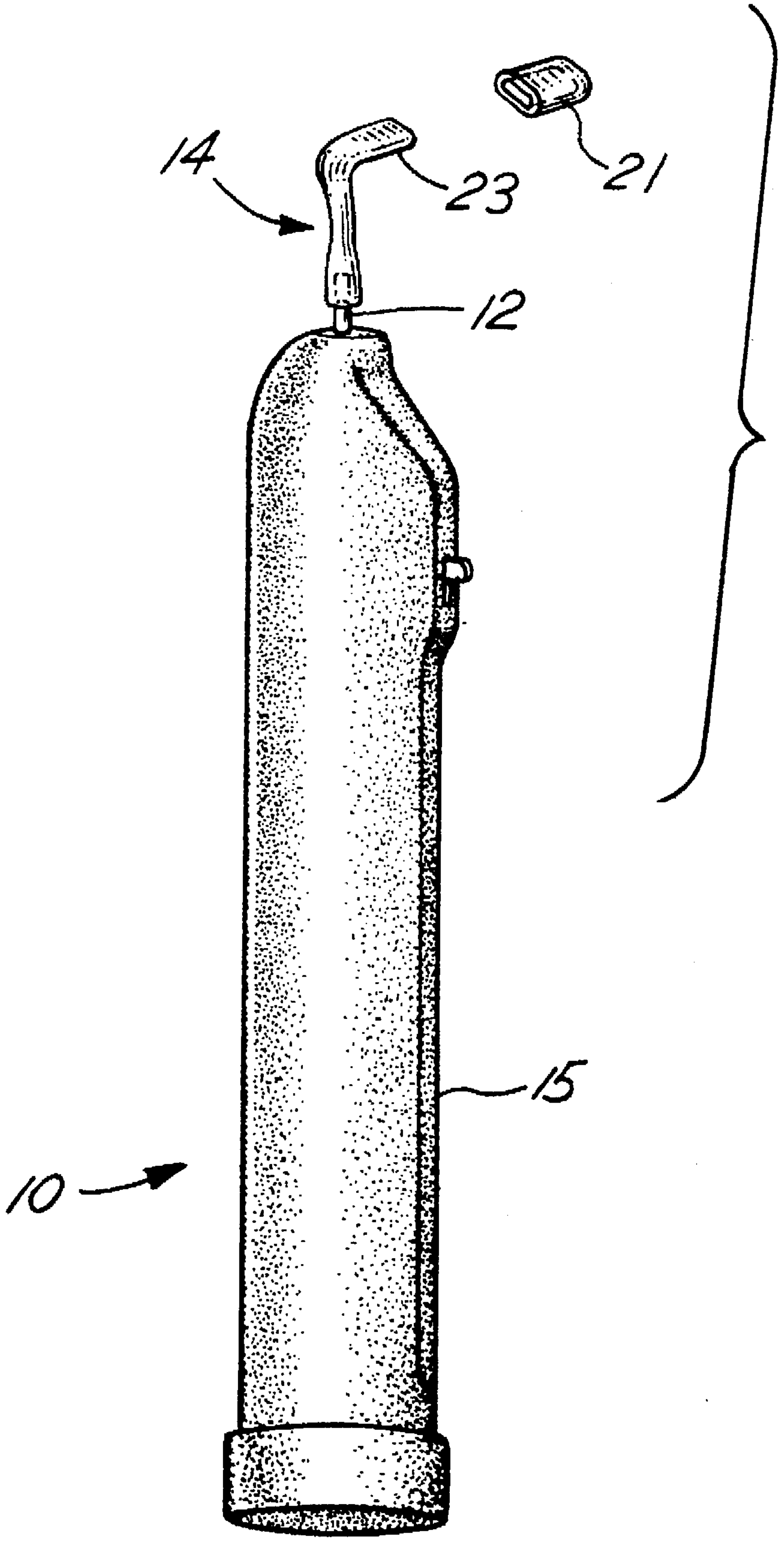
FIG. 4 is a perspective of the apparatus with a plastic spatula-like tip and rubber tip attachment.

Referring to FIGS. 1–4, the apparatus of the present invention consist of three principle parts: a vibrator 10, a shaft 12, and a tip 14. The vibrator 10 is a mechanism designed to generate vibrational motion having both frequency and amplitude. Such mechanisms are well known and have been used in applications ranging from massagers to razors. Examples of such vibrating mechanism include the VIBRA-Shave™ from Windmere and the massagers manufactured and sold by Vitec. The vibrator 10 of the present invention is preferably electrically powered. It may be rechargeable or contain a battery. Preferably, the vibrator 10 is water proof so as to avoid any potential shock to a patient being treated; and the rate of vibration is adjustable, having at least a high and low setting. The frequency range of the vibrating mechanism is preferably between 2000 RPMs and 8500 RPMs. The amplitude is preferably in a range from 1/32 inch to 1/8 inch. These speeds are much higher and amplitudes are much lower than with a typical extra-oral vibrators.

In a particularly preferred embodiment the vibrator 10 is small enough to be hand held allowing for easy manipulation. The vibrator 10 has a vibrator body 15 that is substantially cylindrical in shape with a rechargeable battery stored internal to the body 15. At one end of the vibrator body 15 is a shaft mounting structure 16. The shaft mounting structure 16 may be the shaft mounting structure 16 is adapted to hold a plurality of shafts 12. As shown in FIG. 2, the shaft mounting structure 16 is positioned lateral to the vibrator body 15. The shaft mounting structure 16 defines a plurality of apertures 18 sized to receive the shafts 12 and hold them securely. The interaction of the vibrator 10 and the shafts 12 is such that vibrational motion is transferred to the shafts 12.

It is preferred that the shaft 12 be removably mounted to the shaft mounting structure 16. With removability, the shaft 12 can be replaced from patient to patient thereby reducing the chance for transmission of disease.

The shaft 12 defines a first end 20 and a second end 22. The first end 20 is adapted to mount on the shaft mounting structure 16. In the embodiment shown in FIG. 2 the first end 20 of the shaft 12 is of the appropriate size and shape to tightly fit within and pass through aperture 18.

The shaft 12 may be of any appropriate shape, but is preferably an elongated cylinder. In a preferred embodiment the shaft 12 is capable of being deformed or bent to improve the ability to reach certain areas within the mouth. The shaft 12 may be made of any appropriate material such as compressed paper or plastic. Preferably, the shaft 12 is made of relatively inexpensive materials and is disposable after each use.

The tip 14 is located at the second end 22 of the shaft 12. The tip 14 may be of any appropriate shape. The shape will often be dictated by the application. For example, if it is desired to treat the palatal area a rounded tip 14 will be used, or if the device is used to facilitate numbness in deep scaling, wide tips 14 are used.

The tip may also be of various construction. FIG. 1 shows the tip 14 as a pad 17. The pad 17 is preferably made of a soft absorbing material such as an open cell foam or a cotton swab. It may also be desired that the pad 17 be slightly abrasive, although not so abrasive as to cause substantial irritation to the oral tissue when the pad 17 is rubbed against the tissue. FIG. 2 illustrates an embodiment wherein the multiple pads 17 are employed. FIG. 3 illustrates on embodiment wherein the tip 14 includes placement bristles 19. The use of placement bristles 19 is effective in placing restorative materials such as sealants into the cavity preparation and in reducing air bubbles in paste-like filling material. In other applications, the tip 14 may be a hard plastic rod for vibrating porcelain and resin inlays/onlays into place or a spatula-like instrument 23 for placing paste-like filling material as shown in FIG. 4. FIG. 4 also illustrates how the tip 14 can be fitted with a rubber cap 21 for use in some applications. It is even envisioned that the end of the shaft 12 may be an effective tip 14, for some procedures. The application often dictates the appropriate construction of the tip 14.

In a particular embodiment, the tip 14 and the shaft 12 are a unitary structure. Specifically, the tip 14 is permanently affixed to the shaft 12 at its second end 22. This unitary structure is the mounted on the vibrator 10 and may be disposed of after use with a patient and replaced with a new tip/shaft combination. An example of such a unitary structure is currently sold as a disposable toothbrush under the tradename TOOTHETTE by Halbrand Inc.

In use, the vibrator 10 of the present invention may be covered with a removable protective sheath. Such sheath may comprise a plastic bag. This sheath keeps the apparatus clean and allows reuse without the need to clean the apparatus. Thus, cleaning would simply require replacing the sheath. In a preferred embodiment, the first end 20 of the shaft 12 is formed in a manner to allow it to easily pierce the sheath and mount on the shaft mounting structure 16, an example of such forming is the first end 20 being formed into a point. In this manner, a good seal can be made between the sheath and the shaft 12, thus isolating the vibrator 10 from any spray that may be created during use.

The apparatus of the present invention may be used for various applications within the mouth. The applications include, applying and enhancing the effect of topical anesthetics to avoid the discomfort of oral injections, burnishing fluoride into the teeth, application of medicaments to aphthous ulcers, enhancing the restoration of caries lesions as filled with paste material through the facilitation of placement in the cavity preparation and the removal of air bubbles, burnishing desensitizers, vibrating in sealants, treatment of dry sockets (Alveolar Osteitis) and a novel method of relaxing intra-oral muscles associated with TMJ.

In general, the apparatus is used to treat oral tissue by intra-orally vibrating the oral tissue, with or without a medicament. Such vibrational motion has the beneficial effect of relaxing muscle tissue, increasing vascularity, creating numbness and aiding the penetration of medicaments. In addition, the vibration can have a psychological effect as a distraction from the dental procedure. The vibrational motion is particularly effective in enhancing the effect of medicaments. In practice, the tip 14 is coated with or saturated with the medicament. The tip 14 is then put in contact with the tissue to be treated. The vibrator 10 is the turned on and the tip 14 is allowed to massage the tissue for an appropriate time, generally 30 to 60 seconds. After this massage the tissue will be numb and ready for further treatment. Often it is advantageous to continue the massage during the treatment. In some cases, it may be advantageous to also apply some medicament directly to the tissue prior to the massage.

The present invention is especially effective with the treatment of children. It is believed that this is due to an increased absorption by children's tissues and the fact that the bone is not as thick or as hard. Also, the depth of vibration may be greater in children, and the distraction of the device might be a significant factor. For example, when extracting children's teeth, a substantial number of primary teeth can be removed with just nitrous oxide and the use of the apparatus of the present invention with topical anesthetic, i.e., there is no need for a local anesthetic. Indeed, patients have been comfortable as slithers of primary roots were removed without ever having received a local anesthetic. It should be noted that it is often preferred that the vibrator device be in place and running, during the extraction. This may enhance the effect of the present invention. To facilitate this procedure, the patient may hold the apparatus in place.

In addition, the apparatus of the present invention is especially effective in dental treatment that involve the placement of cement or paste like materials. Placement of inlays or onlays are an example. Use of the present invention allows the cement to flow evenly over the prepared surface and eliminates trapped air bubbles resulting in better adhesion of the inlay or onlay. Similarly, in cementation associated with pulpotomy/pulpectomy of primary teeth use of the apparatus of the present invention allows the cement material to flow into the prepared tissue without the "pull-back" towards the placement point.

The following examples illustrate specific methods for use of the apparatus of the present invention.

EXAMPLE I

Application of Anesthetic

The apparatus of the present invention is fitted with a tip 14 comprising two absorbable pads 17. The target tissue is dried and topical anesthetic is placed on the surfaces of the pads 17 to be positioned on the targeted tissue. Topical anesthetic is also applied to the target tissue with a conventional cotton swab. The pads 17 are then positioned on the tissue and the vibrator is turned on a low speed. In cases where needed, one pad 17 can be in facial (buccal) vestibule and the other pad 17 positioned lingual to the tooth. After the patient has become adjusted to the vibrations, the vibrator can be set on a higher speed. After about 60 seconds, the pads 17 are removed. This vibration will cause the target tissue to become numb and allow the topical anesthetic to achieve deeper penetration in the tissue. Immediately upon removal of the pads 17, the injection of anesthetic is given. Then the lip is shaken down over the needle in a conventional manner. At this point, there are two options: (1) continue to inject very slowly or (2) vibrate the injection area to increase the uptake of the local anesthetic and inject again, doing this in increments until the desired depth is reached and the bulk of the anesthetic is deposited. Care must be taken to not touch bone until the adjacent area is numb.

EXAMPLE II

Extraction of Teeth Without Substantial Root Structure

The target tissue is dried. Topical anesthetic is applied to the tissue with a conventional cotton swab, at both the facial and lingual positions. The apparatus of the present invention is fitted with two absorbable pads 17. The two pads 17 are placed facially and lingually to the teeth to be extracted. The operator or the patient can hold the vibrator 10. It is believed that the vibration coming from both the facial and lingual positions tends to better numb the socket. After 45–60 seconds, the socket is numb. The vibrator can now be removed from the mouth, or can remain running in place during the extraction procedure. The tooth is removed by conventional means with the exception that there is no need for a local anesthetic.

EXAMPLE III

Deep Scaling

Two wide pads 17 are selected and fitted onto the vibrator 10. The tissue is dried and the pads 17 are placed in the vestibule of the quadrant to be scaled. The labial tissue is vibrated for approximately sixty seconds. When scaling of this facial area is almost complete, the pads 17 are then placed on the lingual area for about sixty seconds while the facial/buccal area scaling is completed. The lingual area is then ready to be scaled.

EXAMPLE IV

Dry Socket Treatment

Place iodoform gauze soaked in eugenol or a commercial dry socket medication into the socket and wait for patient to adjust. Bend the shaft 12 without a tip 14 to the correct angle and gently press and vibrate at slow speed, on top of the gauze, for 30–45 seconds. With this technique the patient experiences less pain through better absorption and quick healing as a result of increased vascularity.

EXAMPLE VI

Enhanced Low Temperature Treatment

Discomfort experienced during injections in the anterior palate can be reduced significantly when the area is "frozen" with the apparatus of the present invention. A single pad 17 is selected. The pad 17 is trimmed to an appropriate shape. The trimmed pad 17 is saturated with water, placed in freezer, and frozen. Topical anesthetic is vibrated into the anterior palate area following a procedure similar to that of EXAMPLE I. The prepared frozen pad is then vibrated onto the target tissue. The injection is then performed with little or no discomfort. An alternative to freezing is to spray dichlorodifluoromethane on the pad 17, and then vibrate the tissue for about 5 seconds. During the injection itself, it may be helpful to disconnect the shaft\pad from the vibrator and use the frozen pad to apply a lot of momentary pressure at injection site.

EXAMPLE VII

Aphthous Ulcer Treatment

A conventional ulcer medicament is placed on the pad 17 and vibrated onto the ulcerated area for thirty seconds, at little discomfort to the patient.

EXAMPLE VIII

Palatal Injections

To reduce pain associated with palatal injection, the labial vestibule is vibrated with the apparatus of the present invention, as discussed in EXAMPLE I, and then injected with anesthetic. A short shaft 12 is then selected and bent forward to the appropriate angle. The shaft 12 is fitted with a smaller, rounded pad 17 and the pad 17 is placed into the smaller end of a dappen dish containing a liquid topical anesthetic (Dyclone 0.5% or 1% Astra) or a gel, such as 20% Benzocaine. The pad 17 is dipped to saturation, inserted into the vibrator 10 and vibrated for 1–2 seconds to remove excess anesthetic. The lingual tissue is dried. The pad 17 is placed on top of the incisive papilla and the shaft 12 is checked for correct angle, with more bending if necessary. The pad 17 is vibrated under pressure for two-three minutes. The vibration increases circulation and opens up the pores in the thick, fibrous palatal tissue allowing better absorption of the liquid and decreasing the time necessary for Dyclone or 20% Benzocaine to take effect. An injection can then be given slowly adjacent to the lateral border of the incisive papilla with little to no discomfort while the vibrating pad is still in place. The procedure is efficient timewise as the patient can be firmly vibrating the incisive papilla while anesthetic is being slowly added in the labial vestibule.

EXAMPLE IX

Reduction of Air Bubbles During the Placement of Paste-like Restorative Materials The apparatus of the present invention is fitted with a spatula-like tip 23, as shown in FIG. 4. The composite or glass ionomer material is picked up by smearing the plastic tip down into the material and then the material is placed into the cavity preparation. The material is then vibrated in such a manner as to lower the viscosity of the material enabling it to flow better into the comers of the cavity preparation. This vibration is at a speed of approximately 2,000–2,500 RPM. The vibration also causes the undesirable air bubbles to dissipate at the surface of the material and cause the material to become thixotropic (less likely to stick to the plastic tip and to more easily pull away as the plastic tip is withdrawn).

EXAMPLE X

Placement of Sealant Material

The apparatus of the present invention is fitted with placement bristles 19 as a tip, as shown in FIG. 3. Dental sealant material (untilled resin) is applied to a cavity preparation and vibrated into the etched pits and fissures with light pressure from the placement bristles 19 in such a manner as to force the material into the deeper areas, reduce the viscosity, and reduce the inclusion of air bubbles.

EXAMPLE XI

TMJ Treatment

The apparatus of the present invention is fitted with soft pads 17. The soft vibrating pads 17 are compressed and slipped between the upper and lower front teeth (patients with TMJ can sometimes barely open their mouths). Once the pads 17 are on the inside of the mouth, the pads 17 will assume their original dimensions. The intra-oral muscles can then be massaged by contacting the pads 17 to the muscle and turning on the vibrator 10.

EXAMPLE XII

Placement of Inlays And Onlays

The apparatus of the present invention is used to enhance the placement of porcelain inlays. The apparatus is fitted with a plastic tip 23, as shown in FIG. 4. A rubber cap 21 is placed on the end of the tip 23. An appropriate amount of cement is applied to the under surface of the inlay. The inlay is placed on the tooth. The plastic tip 23 with the rubber cap 21 is then pressed against the outer surface of the inlay. The vibrator 10 is turned on at a speed of about 2500 RPM, causing the tip 14 to vibrate the inlay. This vibrational motion decreases the viscosity of the cement, allowing it to flow between the surface of the tooth and the inlay. Vibration is applied for about 60 seconds. This method enhances the effectiveness of the cementation.

EXAMPLE XIII

Treatment of Swollen Fistula or Abscesses

When a patient has a defined swollen area (abscess) due to an infected tooth or other infection, these areas are difficult to anesthetize because: (1) the liquid purulent material (pus) within the infection dilutes the injected (liquid) anesthetic; and (2) the purulent material is acidic and neutralizes the basic anesthetic. Use of the apparatus of the present invention addresses this problem.

The apparatus of the present invention is fitted with a soft pad 17. The pad 17 is coated with the topical anesthetic and the defined swollen area is vibrated for 1–2 minutes. The pad 17 is withdrawn to an adjacent area and remains running (as a distraction), while the area just vibrated is cut (lanced) with a sharp surgical blade, resulting in drainage, with little or no pain for the patient. Once the incision is made, the purulent area can gently be "milked" through the incision with gentle pressure and vibration from the apparatus of the present invention. This vibration lowers the viscosity and enhances the drainage. After the level of pus is reduced, the area can be injected with anesthetic, if necessary.

EXAMPLE XIV

Vibration of Cements Into Pulpotomy/Pulpectomy of Primary Teeth

Broaches are used to remove the pulpal/canal tissue in the usual manner. Calcium hydroxide, zinc-oxide-eugenol-formocresol or the cement of choice is placed into the canals with the apparatus of the present invention. The apparatus can be fitted with either the placement bristle tip 19 or a blunt plastic tip such as the end of the shaft. Vibrational action is applied to the cement lowering the viscosity of the cement and allowing it to flow into the small canals. This method allows the material to be placed easier without adhesion to the placement instrument that often results in pull back.

The above technique can also be used with permanent teeth, including the use of Sargenti paste.

EXAMPLE XV

Placement of Direct Laminates

After etching and bonding, the composite material is placed directly on the tooth surface with the composite syringe. The apparatus of the present invention is fitted with a flat plastic tip 23 and vibration energy is used to spread the material to its precise location and desired thickness.

EXAMPLE XVI

Placement of Retractor Strings

The tooth is prepared for a crown in the usual manner. Prior to the impression, the retractor string is placed around the tooth in the usual manner. The apparatus of the present invention is fitted with a plastic spatula-like tip 23. The spatula-like tip 23 vibrates the string down into the sulcus. The vibrating action minimizes any adhesion between the tip 23 and the string resulting in reduced pull-back toward the placement point.

Preferred embodiments of the present invention are described herein. It is to be understood, of course, that changes and modifications may be made in the embodiments without departing from the scope and spirit of the present invention, as defined by the appended claims.

What is claimed:

1. A method for applying topical anesthetic to oral tissue, comprising:

a) absorbing the topical anesthetic onto an absorbable pad;
b) applying the pad to the oral tissue to be treated; and
c) vibrating the pad with a mechanical vibrator, at a speed sufficient to massage the topical anesthetic into the oral tissue.

2. The method of claim 1 further comprising the step of applying medicament directly to oral tissue to be treated, prior to vibrating.

3. The method of claim 1 wherein the oral tissue is the alveolar mucosa region of the mouth.

4. The method of claim 1 wherein the oral tissue is the alveolar mucosa affected with an aphthous ulcer.

5. A method of reducing the discomfort from oral anesthetic injections, comprising preparing the tissue to be injected by:

a) applying a topical anesthetic to the tissue to be injected;
b) applying a pad to the tissue, said pad further containing the topical anesthetic; and
c) vibrating the pad with a mechanical vibrator, at a speed sufficient to massage the topical anesthetic into the tissue.

6. The method of claim 5 wherein the tissue is the alveolar mucosa.

7. The method of claim 5 wherein the tissue is the palatal.

8. The method of claim 5 further comprising the step of continuing the massage during the injection.

* * * * *